(12) United States Patent
Momoi et al.

(10) Patent No.: US 6,575,037 B2
(45) Date of Patent: Jun. 10, 2003

(54) MULTIPLE DEGREE OF FREEDOM VIBRATION EXCITING APPARATUS AND SYSTEM

(75) Inventors: Yasuyuki Momoi, Ushiku (JP); Toshihiko Horiuchi, Ushiku (JP); Kazuhiro Umekita, Tsuchiura (JP); Masahiko Inoue, Ibaraki-ken (JP); Takao Konno, Ibaraki-ken (JP); Masaharu Sugano, Ibaraki-ken (JP); Yuuji Tadano, Takamatsu (JP)

(73) Assignee: Hitachi, Ltd., Tokyo (JP)

( * ) Notice: Subject to any disclaimer, the term of this patent is extended or adjusted under 35 U.S.C. 154(b) by 2 days.

(21) Appl. No.: 09/911,477

(22) Filed: Jul. 25, 2001

(65) Prior Publication Data

US 2002/0042667 A1 Apr. 11, 2002

Related U.S. Application Data

(62) Division of application No. 09/381,037, filed as application No. PCT/JP97/00836 on Mar. 17, 1997.

(51) Int. Cl.⁷ ................................................ G01M 7/02
(52) U.S. Cl. ........................................................ 73/633
(58) Field of Search ......................... 73/662, 663, 664, 73/665, 666, 667, 668, 669, 670, 671, 672

(56) References Cited

U.S. PATENT DOCUMENTS

| | | | | |
|---|---|---|---|---|
| 3,827,289 A | * | 8/1974 | Borg | 73/118.1 |
| 4,026,383 A | * | 5/1977 | Bedenbender et al. | 181/121 |
| 4,181,028 A | * | 1/1980 | Talbott, Jr. | 73/665 |
| 4,436,188 A | * | 3/1984 | Jones | 188/378 |
| 5,048,342 A | * | 9/1991 | Morelli | 73/117.2 |
| 5,388,056 A | | 2/1995 | Horiuchi et al. | 73/664 |
| 5,422,834 A | | 6/1995 | Horiuchi et al. | 703/7 |
| 5,618,995 A | * | 4/1997 | Otto et al. | 434/62 |
| 5,737,239 A | | 4/1998 | Horiuchi et al. | 73/662 |
| 6,035,715 A | * | 3/2000 | Porter | 73/432.1 |
| 6,247,366 B1 | * | 6/2001 | Porter | 73/432.1 |

FOREIGN PATENT DOCUMENTS

| | | |
|---|---|---|
| JP | 61-34438 | 2/1986 |
| JP | 62-24124 | 2/1987 |
| JP | 5-10846 | 1/1993 |
| JP | 7-306115 | 11/1995 |

OTHER PUBLICATIONS

The 43rd National Congress of Theoretical & Applied Mechanics, 1994, "Development of Substructured Hybrid Earthquake Response Test Methods with 3 DOF Loading System", H. Iemura et al, pp. 581–582.

* cited by examiner

Primary Examiner—Helen Kwok
Assistant Examiner—Rose M. Miller
(74) Attorney, Agent, or Firm—Mattingly, Stanger & Malur, P.C.

(57) ABSTRACT

The testing performs a vibration excitation testing of a part of the structure, performs a numerical calculus of vibration response of the other parts of the structure, and calculates the vibration response of a whole of the structure by combining these two methods. Testing includes calculating a position of a point of exciting force on the basis of vibration exciting, and calculating a reaction force on the basis of a load detected and the position of the point of exciting force. Then, a displacement of a numerical model is computed by using the reaction force calculated and a known external force, and calculating a vibration exciting machine displacement command value on the basis of the displacement. A drive drives the vibration exciting on the basis of an output thereof. Vibration excitation is performed in the translational direction as well as the rotational direction.

1 Claim, 5 Drawing Sheets

MULTIPLE DEGREE OF FREEDOM VIBRATION EXCITING APPARATUS AND SYSTEM

This is a divisional application of U.S. Ser. No. 09/381,037, filed Dec. 2, 1999, which is a 371 of PCT/JP97/00836, filed Mar. 17, 1997.

BACKGROUND OF THE INVENTION

This invention relates to a vibration exciting apparatus which performs a vibration exciting testing of the multi degree of freedom and a vibration testing system of the structure. This vibration testing system examines a vibration exciting motion for a part of the structure experimentally by using the vibration exciting apparatus, calculates a vibration exciting motion for the other part of the structure with a numerical calculation of vibration response and calculate a vibration exciting motion for a whole of the structure by combining them.

The example of the vibration test of the structure is mentioned in JP-A-5-10846. This vibration testing system performs a vibration exciting testing for a part of the structure experimentally, executes a numerical calculation of vibration response for the other parts of the structure, and performs a testing for the whole of the structure by combining them. The method mentioned in this publication performs a vibration exciting testing by using one vibration exciting machine at the real time.

Here, as the vibration exciting apparatus used for experimentally causing a vibration excitation, an apparatus for applying a load in a translational direction and a rotational direction to a body to be tested is mentioned page 581 of the 43rd Nat. Cong. of Theoretical & Applied Mechanics, 1994.

By the way, the apparatus mentioned in the publication mentioned above, that is JP-A-5-10846, is based on the case that a prototype model is deformed in only one direction and moreover any one of the following assumptions is established. That is, (1) a rigidity of a floor in a building is very large in comparison with a rigidity of a wall, and a bending deformation of the floor can be negligible. Furthermore, a rigidity of the wall in-plane deformation is large in comparison with a rigidity of the wall out-plain deformation, so that an expansion and compression of the wall can be negligible. (2) A prototype model is supported on both end portions without taking moment.

However, according to the invention analysis that is a part of the present invention, actual piping system, pier, vibration isolation apparatus and the like are structures transformed in both of the translational direction and the rotational direction. Therefore, it is desirable to perform a vibration excitation with respect to the prototype models in the translational direction and the rotational direction. However, in the apparatus mentioned in the publication mentioned above, that is JP-A-5-10846, there is no consideration of the structure of applying the vibration excitation in both directions. Therefore, it was difficult to know these vibration exciting motions precisely. On the other hand, in the case of the latter in which the vibration excitation can be performed in the translational direction and the rotational direction with respect to the prototype model, a vibration exciting machine having a large mass swings, and a force of inertia and the elastic force of the oil hydraulic pipe acts as a disturbance with respect to the vibration excitation. Therefore, there is a problem that vibration excitation precision decreased. Furthermore, in this apparatus, since the vibration exciting machine was arranged inside a reaction force frame, it has been hard to make the reaction force frame compact and of high rigidity.

SUMMARY OF THE INVENTION

The invention is made by taking the problems of the prior art mentioned above into consideration, and an object of the invention is to provide a vibration exciting apparatus capable of testing a structure which deforms in both of a translational direction and a rotational direction and a vibration testing system using the same.

Another object of the invention is to provide a vibration exciting apparatus which has an improved accuracy of a vibration excitation, a compact size and a high rigidity and which is used for a vibration testing system.

In order to achieve the object mentioned above, in accordance with a first aspect of the invention, there is provided a vibration testing system for a structure, which is provided with a vibration exciting apparatus for causing a vibration excitation for a prototype model imitating a part of the structure and a control calculating apparatus for calculating a vibration response of a numerical model imaginarily connected to the prototype model, and performs a vibration testing of a whole of the structure, wherein the vibration exciting apparatus is provided with a plurality of vibration exciting means for causing a vibration excitation of the prototype model, a plurality of displacement detecting means for detecting displacements of the plurality of vibration exciting means and load detecting means for detecting a load applied to the prototype model, and the control calculating apparatus is provided with calculating means for calculating displacements in a translational direction and a rotational direction of a point of exciting force previously determined on the basis of the load detected by the load detecting means and the displacement of the vibration exciting means detected by the plurality of displacement detecting means, and signal generating means for generating a drive signal driving the vibration exciting means on the basis of an output of the calculating means.

In accordance with a second aspect of the invention in order to achieve the object mentioned above, there is provided a vibration testing system, which is provided with a vibration exciting apparatus for causing a vibration excitation for a prototype model imitating a part of the structure and a digital calculator for calculating a vibration response of a numerical model imaginarily connected to the prototype model, and performs a vibration testing of a whole of the structure, wherein the vibration exciting apparatus is provided with a plurality of vibration exciting means and the plurality of vibration exciting means are arranged in such a manner as to simultaneously apply a translational displacement and a rotational displacement to the prototype model.

Then, preferably, the vibration exciting apparatus has at least three vibration exciting means and includes a horizontal vibration exciting machine for causing a vibration excitation in a horizontal direction and a vertical vibration exciting machine for causing a vibration excitation in a vertical direction and has at least two joints for structurally connecting between the vibration exciting means and the prototype model; a horizontal link is connected to the horizontal vibration exciting means and a vertical link is connected to the vertical vibration exciting means, respectively, and at least one of the horizontal links and at least one of the vertical links are connected to the joint; joint fixing means for fixing the joint to the vibration exciting apparatus is provided and load detecting means capable of detecting loads in at least two different directions is provided between the joint fixing means and the joint; joint fixing means for mounting the prototype model is mounted to the joint and load detecting means capable of detecting at least any one of a load in the different two directions and a moment around an axis is provided in the joint fixing means; there are provided vibration excitation point position calculating means for calculating a position of a point of exciting force from the displacements of a plurality of vibration exciting means, vibration excitation point acceleration estimating means for estimating an acceleration of a point of exciting force on the basis of any one of a displacement, a velocity and an acceleration of at least the vibration exciting means, and a reaction force calculating apparatus for calculating a reaction force of the prototype model on the basis of the acceleration estimated by the vibration excitation point acceleration estimating means, the load detected by the load detecting means and the position of the point of exciting force calculated by the vibration excitation point position calculating means; and there are provided any one of at least acceleration detecting means and angular acceleration detecting means, vibration excitation point velocity and acceleration calculating means for calculating an acceleration of a point of exciting force on the basis of a detected value of any of the detecting means, vibration excitation point position calculating means for calculating a position of a point of exciting force, and reaction force calculating means for calculating a reaction force of the prototype model on the basis of the load detected by the load detecting means, the position of the point of exciting force calculating by the vibration excitation point position calculating means and the acceleration of the point of exciting force calculated by the vibration excitation velocity and acceleration calculating means.

In accordance with a third aspect of the invention in order to achieve the object mentioned above, there is provided a vibration exciting apparatus having a plurality of vibration exciting means for causing a vibration excitation of a body to be tested and a frame for mounting the vibration exciting means, wherein the plurality of vibration exciting means are arranged in such a manner as to simultaneously apply a translational displacement and a rotational displacement to the body to be tested.

Then, preferably, there are provided at least three vibration exciting means and there are included a horizontal vibration exciting machine for causing a vibration excitation in a horizontal direction and a vertical vibration exciting machine for causing a vibration excitation in a vertical direction; there are provided at least two joints for capable of structurally connecting between a body to be tested and the vibration exciting means; a horizontal link is connected to the horizontal vibration exciting means and a vertical link is connected to the vertical vibration exciting means, respectively, and at least one of the horizontal links and at least one of the vertical links are connected to the joint; there is provided joint fixing means for fixing the joint and load detecting means capable of detecting loads in at least two different directions and a moment around one axis is provided in the joint fixing means; there are provided vibration excitation point acceleration estimating means for estimating an acceleration of a point of exciting force on the basis of any one of at least a displacement, a velocity and an acceleration with respect to the horizontal vibration exciting machine and the vertical vibration exciting machine, vibration excitation point position calculating means for calculating a position of a point of exciting force from the displacements of the horizontal vibration exciting machine and the vertical vibration exciting machine, and reaction force calculating means for calculating a reaction force from the body to be tested on the basis of the load detected by the load detecting means, the position of the point of exciting force calculated by the vibration excitation point position calculating means and the acceleration of the point of exciting force estimated by the vibration excitation point acceleration estimating means; and there are provided any one of at least acceleration detecting means and angular acceleration detecting means, vibration excitation point velocity and acceleration calculating means for calculating an acceleration of a point of exciting force on the basis of a detected value of any of the detecting means, vibration excitation point position calculating means for calculating a position of a point of exciting force, and reaction force calculating means for calculating a reaction force of the prototype model on the basis of the load detected by the load detecting means, the position of the point of exciting force calculating by the vibration excitation point position calculating means and the acceleration of the point of exciting force calculated by the vibration excitation velocity and acceleration calculating means.

DESCRIPTION OF THE PREFERRED EMBODIMENTS

Figure 1:
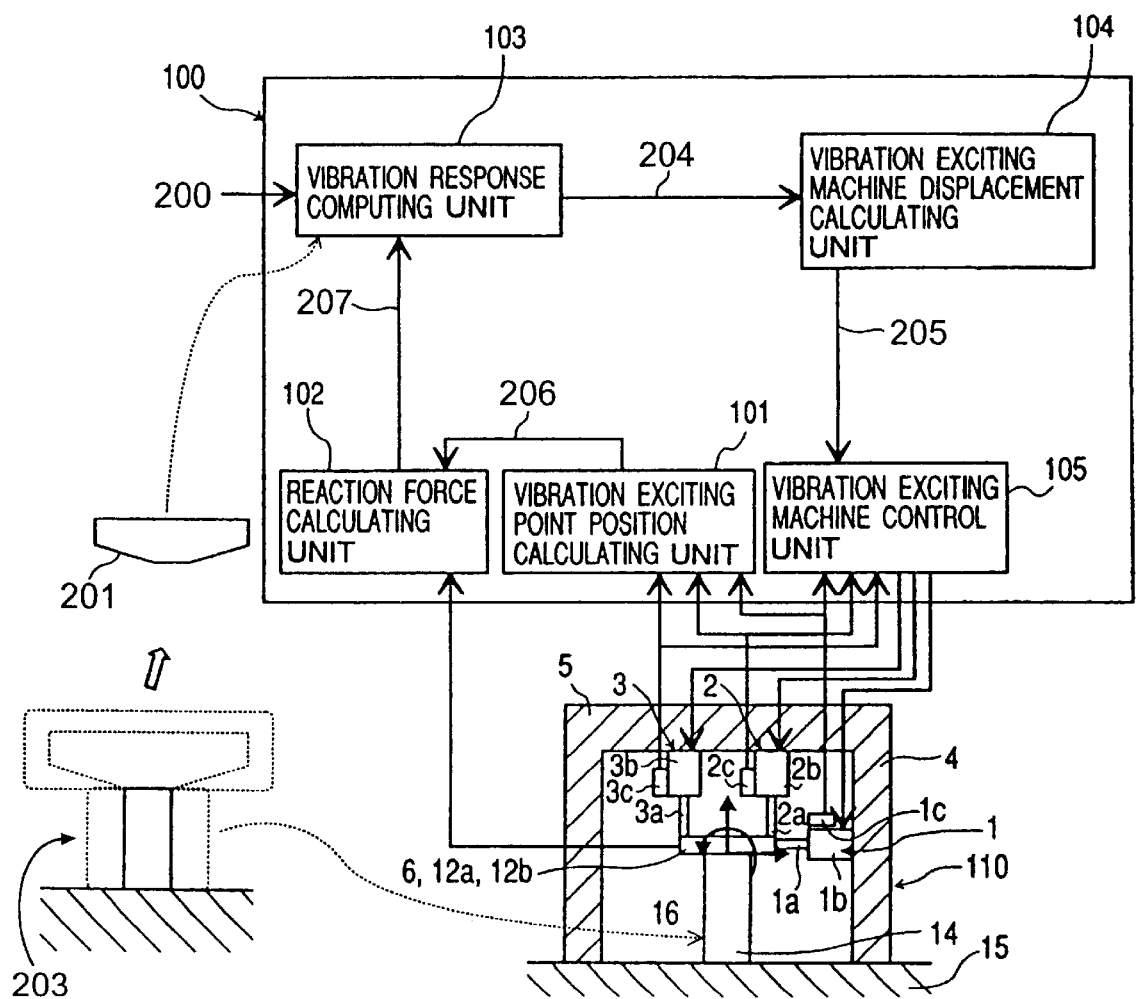
FIG. 1 is a schematic view of a first embodiment of a vibration testing system in accordance with the invention.

Some embodiments of this Invention are explained in detail by using the drawing.

Figure 2:
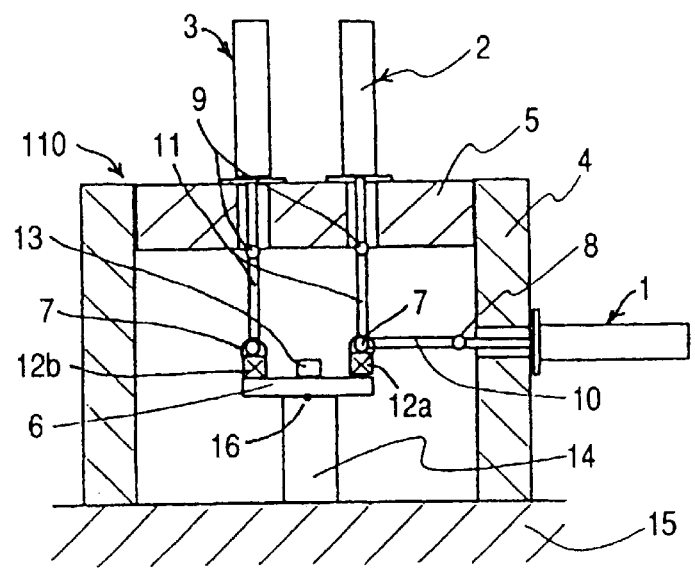
FIG. 2 is a schematic view of an embodiment of a multi-axis vibration exciting apparatus in accordance with the invention and used in the FIG. 1 system.
Figure 3:
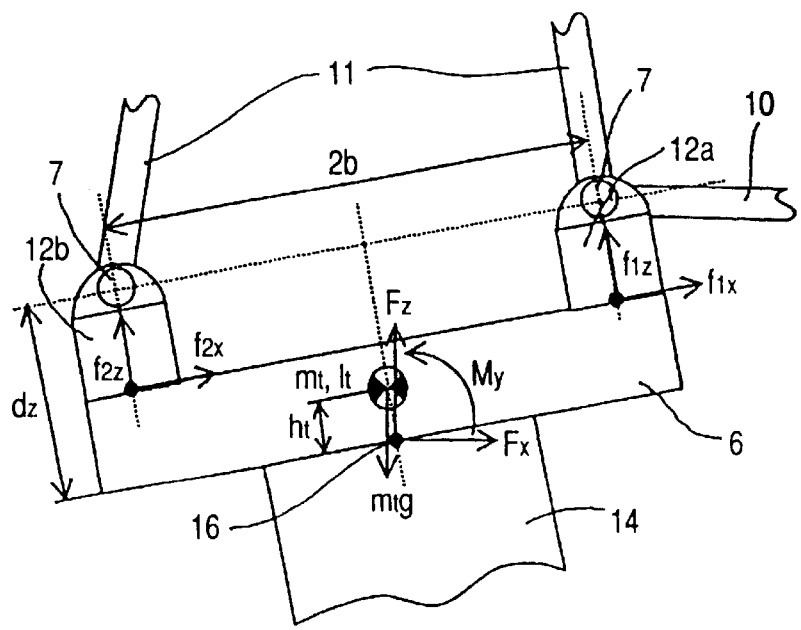
FIG. 3 is a view which explains details of load detecting in the multi-axis vibration exciting apparatus shown in FIG. 2.

FIG. 1 to FIG. 3 show a first embodiment of a vibration testing system which relates to this invention. FIG. 1 is the schematic view of the vibration testing system for a structure 203. FIG. 2 shows an example of the vibration exciting apparatus used for the vibration testing system shown in FIG. 1. FIG. 3 shows details of the load detecting means used in FIG. 2. The vibration testing system in accordance with this invention performs a vibration exciting testing for a part of the structure 203 to be tested by using a prototype model which has an actual size or a compact size, and another part of the structure 203 is numerically modeled and a calculation of vibration response is performed with respect to the numerically modeled part. Then, both results are combined, and the vibration response of a whole of the structure 203 is evaluated. Therefore, in this embodiment, there are provided a multi-axis vibration exciting apparatus 110 having a plurality of vibration exciting machines 1, 2 and 3, a joint 6 for transmitting displacements of the vibration exciting machine to a prototype model 14 mounted on a base 15, a load detector 12 arranged from the prototype model 14 to the vibration exciting machines 1, 2 and 3, and a control calculating apparatus 100 which controls this multi-axis vibration exciting apparatus 110 and which has a digital calculator or an analog calculator for calculating a vibration response of the numerical model. Vibration exciting machines 1, 2 and 3 have cylinders 1b, 2b and 3b, drive shafts 1a, 2a and 3a and displacement detectors 1c, 2c and 3c.

The control calculating apparatus 100 has each of the following. That is, there are provided vibration excitation position calculating unit 101 for calculating a position of a point of exciting force 16 placed at a boundary portion between the numerical model and the prototype model 14 on the basis of the displacement of each of the vibration exciting machine 1, 2 and 3, reaction force calculating unit 102 for calculating a reaction force generated in the prototype model 14 on the basis of a load detected by the load detector 12 and a position of the point of exciting force 16, vibration response computing unit 103 for calculating a displacement of the numerical model 14 after a predetermined time has passed on the basis of the reaction force generated in the prototype model 14 and a known external force, vibration exciting machine displacement calculating unit 104 for calculating a displacement command value of each of the vibration exciting machines 1, 2 and 3 from a position command value of the point of exciting force 16, vibration exciting machine control unit 105 for operating the vibration exciting machines 1, 2 and 3 in accordance with the displacement command value to the vibration exciting machines 1, 2, 3.

By the way, one of the features of this invention exists in setting up the point of exciting force where a rotational displacement and a translational displacement can be given. This point of exciting force 16 is chosen from the point which definitely expresses a deformation of the prototype model or a point corresponding to the point in a manner of 1 to 1. That is, if the displacement of the prototype model is calculated from the displacement of the point at high accuracy when optionally selecting the point of exciting force, it is possible to set the point as the point of exciting force. For example, in the case of performing a vibration excitation testing with respect to the structure shown in FIG. 1, a column portion is set to the prototype model and an upper portion is set to the numerical model. A method of selecting the point of exciting force at this time will be explained below with reference to FIG. 4. A point of intersection between a neutral axis 20 formed in the prototype model 14 and a boundary surface between the numerical model and the prototype model is set to a boundary point. In a simplified model as shown in FIG. 1, since the neutral axis corresponds to a point which best expresses a deformation of the model, the boundary point is selected as a point of exciting force in the simplest case. However, the boundary point corresponds to an internal point in FIG. 1, and it is hard to actually measure the displacement. In the case of measuring the displacement and controlling the vibration exciting machines 1, 2 and 3 and the like, a point on a surface of the apparatus is preferable. In such a case, it is possible to provide the point of exciting force 16 on the joint 6. However, in that case, it is necessary to calculate for converting into the displacement at the boundary point. On the other hand, in the case of the complex shape, there is a case that it is hard to select the neutral axis. In that case, If there is a neutral axis on the equivalent model, it is preferable to select a point on the neutral axis in the equivalent model. If it is hard to select the neutral axis even in the equivalent model, it is preferable to select a geometrical center point and the like. In either cases, as far as the point which can express a displacement of the prototype model, it is possible to use as the point of exciting force without relation to a necessary of conversion calculation and the like.

Next, the embodiment of contents of a process of the control calculating apparatus 100 will be described below on the basis of an operation procedure.

(1) A prototype model 14 is loaded a displacement by using the multi-axis vibration exciting apparatus 110 in a translational direction and a rotational direction, and the load detected by the load detector 12 is inputted to the control calculating apparatus 100.

(2) The displacement of the vibration exciting machines 1, 2 and 3 at a tie of detecting the load is also inputted to the control calculating apparatus 100, and, the vibration exciting point position calculating unit 101 calculates a position of the point of exciting force 16 on the basis of the displacement of the vibration exciting machine 1, 2 and 3.

(3) The reaction force calculating unit 102 calculates a reaction force generated in the prototype model 14 on the basis of the load detected by the load detector 12 and the position of the point of exciting force 16 calculated at the item (2).

(4) The vibration response computing unit 103 calculates the displacement of the numerical model 201 in the next step corresponding to a step after a predetermined time on the basis of the reaction force calculated in the item (3) and the known external force 200.

(5) By extracting the boundary position between the prototype model 14 and the numerical model, that is, the displacement of the point of exciting force 16 among the displacements of the numerical model obtained in the item (4), the vibration exciting point position calculating unit 104 calculates a displacement command value 204 of each of the vibration exciting machine 1, 2 and 3 on the basis of the displacement.

(6) The vibration exciting machine control unit 105 drives the vibration exciting machine 1, 2 and 3 in accordance with the vibration exciting machine displacement command value 205 calculated in the item (5), and as a result, the prototype model 14 is loaded the displacement by the multi-axis vibration exciting apparatus 110.

The processes from (1) to (6) mentioned above are repeated. Accordingly, even if the subject structure displaces in both directions of the translational direction and the rotational direction, the vibration response thereof can be obtained.

Next, an embodiment of a multi-axis vibration exciting apparatus used for the present vibration testing system will be described below with reference to FIG. 2. The multi-axis vibration exciting apparatus 110 has side walls 4 and 4 fixed to the base 15 in mutually opposing two side surface sides of the prototype model 14. Then, a top plate 5 is arranged above the prototype model 14 in such a manner as to connect two side walls 4 and 4. The side wall 4 and 4 and the top plate 5 constitute a reaction force frame. The horizontal vibration exciting machine 1 has a drive shaft side of the vibration exciting machine cylinder fixed to the side wall 4. This horizontal vibration exciting machine 1 has a joint 8 in the drive shaft. Then, the horizontal vibration exciting machine 1 is arranged so that a vibration exciting machine cylinder is not placed inside the reaction force frame. In the same manner, the vertical vibration exciting machine 2 and 3 having a joint 9 in the drive shaft are structured so that the drive shaft side of the vibration exciting machine cylinder is fixed to the top plate 5 and each of the vibration exciting machine cylinder is arranged so as not to be placed inside the reaction force frame. Furthermore, the joint 6 is connected on an upper surface of the prototype model 14, and the joint 7 is connected to the prototype model 14 via the joint 6.

Though the joint 6 is formed in one plate shape in FIG. 2, however, a shape, a number and a mounting position thereof aren't limited to this, and it is possible to suitably provide as occasion demands. Further, the joint 6 includes a structure provided by working the prototype model 14 itself for mounting the joint 7. Further, the joint 7 mounted to the prototype model 14 is constituted by two in FIG. 2, however, a shape, a degree of freedom, a number and a mounting position thereof aren't limited to this in the same manner as that of the joint 6.

One of the joints 7 of the prototype model 14 and the joint 8 of the drive shaft of the horizontal vibration exciting machine are connected with the horizontal link 10. Further, the one of the joints 7 of the prototype model and the joint 9 mounted to the drive shaft of the vertical vibration exciting machine are connected with the vertical link 11. In the multi-axis vibration exciting apparatus 110 in accordance with the present embodiment, the displacement of each of the horizontal vibration exciting machine 1 and the vertical vibration exciting machine 2 and 3 are transmitted to the joint 7 mounted to the prototype model 14 through the horizontal link 10 and the vertical link 11. As a result, the prototype model 14 is excited.

In the multi-axis vibration exciting apparatus 110 shown in the embodiment mentioned above, since there are only the respective vibration exciting machine drive shaft 1a, 2a and 3a, the horizontal link 10, the vertical link 11, the load detector 12, the joint 6 and the prototype model side joint 7 as a movable portion, a total mass is less than a mass obtained by combining the horizontal vibration exciting machine 1 and the vertical vibration exciting machine 2 and 3. Accordingly, it is possible to widely reduce the inertia force generated at a time of vibration excitation in comparison with the conventional structure in which a whole of the vibration exciting machine swings. Further, in the conventional art, since the pipe for supplying the oil to each of vibration exciting machines moves in correspondence to a swing motion of the vibration exciting machine, an elastic force of the pipe has acted as a disturbance of the vibration excitation. On the other hand, since a vibration exciting machine cylinder is fixed to the reaction force frame in this embodiment, the pipe doesn't move and no influence is applied to the vibration excitation. As mentioned above, in accordance with the present embodiment, since it is possible to reduce the disturbance caused by the force of inertia in the movable portion and the elastic force of the oil hydraulic pipe, an accuracy of the vibration excitation is improved.

Further, since the horizontal vibration exciting machine and the vertical vibration exciting machine have been conventionally arranged in the inner side of the reaction force frame, it is necessary to make the reaction force frame in a large size. However, in accordance with the present embodiment, since the vibration exciting machine cylinder can be arranged in an outer side of the reaction force frame, it is sufficient that the reaction force frame is structured such that the horizontal link 10 and the vertical link 11 can be arranged, so that a length of each of the links can be made shorter than that of the vibration exciting machine cylinder. Accordingly, it is possible to make the reaction force frame compact and thereby make it high rigidity.

Next, a description will be given of a corresponding relation between the displacement of the vibration exciting machine and the position of the point of exciting force which is necessary in the case of exciting with reference to the embodiment mentioned above.

At first, the displacement of the horizontal vibration exciting machine 1 and the displacement of the vertical vibration exciting machine 2 and 3 are calculated on the basis of the position of the point of exciting force 16. The number of horizontal vibration exciting machine is one, and the number of the vertical vibration exciting machine is two. Then, the number of the joint in the side of the prototype model 14 is two. In this case, each of the displacements can be calculated by Formula 1.

$$l_1 = -(x_r - b) + (a_1 - \sqrt{a_1^2 - z_r^2})$$

$$l_2 = -z_r + (a_2 - \sqrt{a_2^2 - (x_r - b)^2})$$

$$l_3 = -z_1 + (a_2 - \sqrt{a_2^2 - (x_1 + b)^2}) \quad \text{(Formula 1)}$$

In which, $$x_r = x - d_z \sin \theta_y + b \cos \theta_y$$

$$z_r = z - d_z (1 - \cos \theta_y) + b \sin \theta_y$$

$$x_1 = x - d_z \sin \theta_y - b \cos \theta_y$$

$$z_1 = z - d_z (1 - \cos \theta_y) - b \sin \theta_y \quad \text{(Formula 2)}$$

In which, x, z, $\theta_y$: position of point of exciting force $l_1$: displacement of horizontal vibration exciting machine 1

$l_2$: displacement of vertical vibration exciting machine 2

$l_3$: displacement of vertical vibration exciting machine 3

$a_1$: length of horizontal link $a_2$: length of vertical link

2b : interval of joint in the side of prototype model (refer to FIG. 3)

Figure 4:
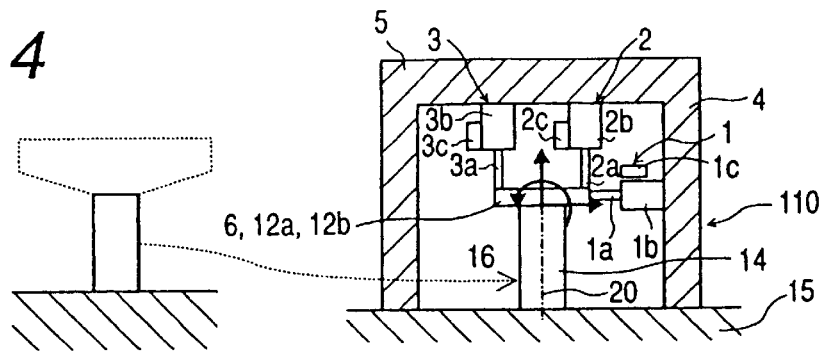
FIG. 4 is a view which explains a point of exciting force in accordance with the invention.

$d_z$: height of joint (refer to FIG. 4)

The displacement of the vibration exciting machine 1, 2 and 3 can be uniquely calculated by using the above formula on the basis of the position of the point of exciting force 16. Further, when the total number of the horizontal vibration exciting machine and the vertical vibration exciting machine is three or more and the number of the joint in the side of the prototype model 14 is two or more, the displacement of the vibration exciting machine can be uniquely determined on the basis of the position of the point of exciting force in accordance with the method mentioned above.

Accordingly, the structure is made such that the total number of the horizontal vibration exciting machine and the vertical vibration exciting machine is three or more and the number of the joint in the side of the prototype model is two or more, where it is possible to uniquely calculate the displacement of the vibration exciting machine on the basis of the position of the point of exciting force.

Then, it is possible to uniquely determine an amount of deformation in both of the translational direction and the rotational direction applied to the prototype model.

On the contrary, it is possible to calculate the position of the point of exciting force on the basis of the displacement of the horizontal vibration exciting machine 1 and the displacement of the vertical vibration exciting machine 2 and 3. A consideration will be given of the case shown in FIG. 2 in which at least one of the horizontal links and at least one of the vertical links are simultaneously connected to any one of the joints in the side of the prototype model. At this time, the position of the point of exciting force can be calculated on the basis of Formula 3.

$$x = x_r - b\cos\phi_y + d_z\sin\theta_y \quad \text{(Formula 3)}$$

$$z = Z_r - b\sin\phi_y + d_z\cos\theta_y + d_z$$

$$\phi_y = \cos^{-1}\frac{4b^2 + (x_r+b)^2 + (a_2 - l_3 - z_r)^2 - a_2^2}{4b\sqrt{(x_r+b)^2 + (a_2 - l_3 - z_r)^2}} -$$

$$\tan^{-1}\frac{a_2 - l_3 - z_r}{x_r + b}$$

In which, $$x_r = b + a_1 - l_1 - a_1\cos\phi_1 \quad \text{(Formula 4)}$$

$$z_r = a_1\sin\phi_1$$

$$\phi_1 = \tan^{-1}\frac{a_2 - l_2}{a_1 - l_1} -$$

$$\cos^{-1}\frac{a_1^2 + (a_1 - l_1)^2 + (a_2 - l_2)^2 - a_2^2}{2a_1\sqrt{(a_1 - l_1)^2 + (a_2 - l_2)^2}}$$

In accordance with the present method, it is possible to strictly calculate the position of the point of exciting force on the basis of the displacement of the horizontal vibration exciting machine and the vertical vibration exciting machine.

As mentioned above, in the vibration testing system in accordance with the present embodiment, the control calculating apparatus 100 for calculating the position of the point of exciting force on the basis of the displacement of the horizontal vibration exciting machine and the vertical vibration exciting machine is necessary. However, in the case that the displacement of each of the vibration exciting machine can't be calculated strictly, an approximate calculation and a convergence calculation are executed. In that case, an insufficient result tends to be caused in view of an operation accuracy and an operation time. Accordingly, if a strict solution can be obtained, the problem can be solved, and a testing accuracy is improved.

Next, the embodiment of calculating the reaction force generated will be described below with reference to FIG. 3. FIG. 3 is a detailed view of the joint 6 shown in FIG. 2. The load detector 12a and 12b for detecting the load in two perpendicularly crossing directions are arranged between the joint 6 and the joint 7 in the side of the prototype model.

A method of calculating the reaction force at this time is as follows. At a time of the vibration excitation, the joint 6, the joint 7 in the side of the prototype model and a load detector 12a and 12b are simultaneously excited, so that a force of inertia, a centrifugal force and a Corioli's force are generated in each of the apparatus. Further, when applying the force so that the prototype model 14 rotates, a joint 6, joint 7 and a load detector 12 generate an overturning moment due to the respective empty weights. These force of inertia, centrifugal force, Corioli's force generated by the vibration excitation, and the overturning moment are overlaid on the reaction force from the prototype model 14 and detected with the load detector 12a and 12b. Accordingly, the reaction force generated in the prototype model 14 can be obtained by subtracting the components of the force of inertia, the centrifugal force, the Corioli's force and the overturning moment from the detected value of the load detector 12a and 12b. The reaction force generated in the prototype model is expressed by Formula 5.

$$F_x = (f_{1x} + f_{2x})\cos\theta_y - (f_{1z} + f_{2z})\sin\theta_y + m_t\ddot{x} - \quad \text{(Formula 5)}$$

$$m_t h_t \cos\theta_y \cdot \ddot{\theta}_y + m_t h_t \sin\theta_y \cdot \dot{\theta}_y^2$$

$$F_z = (f_{1x} + f_{2x})\sin\theta_y + (f_{1z} + f_{2z})\cos\theta_y + m_t\ddot{z} -$$

$$m_t h_t \sin\theta_y \cdot \ddot{\theta}_y - m_t h_t \sin\theta_y \cdot \dot{\theta}_y^2 + m_t g$$

$$M_y = (f_{1z} - f_{2z})b - (f_{1x} + f_{2x})d_z + (I_t + m_t h_t^2)\ddot{\theta}_y -$$

$$m_t h_t \cos\theta_y \cdot \ddot{x} - m_t h_t \sin\theta_y \cdot \ddot{z} - m_t g h_t \sin\theta_y$$

In which, $F_x$, $F_z$, $M_y$: reaction force generated in prototype model $f_{1x}$, $f_{1z}$, $f_{2x}$, $f_{2z}$: load detected from load detectors $\ddot{x}$, $\ddot{z}$, $\ddot{\theta}y$: acceleration of point of exciting force $m_t$: total mass of joint and load detector $I_t$: moment of inertia around center of gravity of whole of joint and load detector $h_t$: height from lower surface of joint to center of gravity of whole of joint and load detector g: acceleration of free fall In accordance with the present embodiment, since the load detector 12 is arranged between the joint 6 and the joint 7, it is possible to obtain the reaction force of the prototype model 14. In this case, when arranging the load detector 12 at the position mentioned above, the number of the parts existing between the prototype model 14 and the load detector is reduced, so that it is possible to reduce an influence caused by a force of inertia, a centrifugal force, a Corioli's force, an empty force and a friction of excessive parts in the load detected value, and to obtain the reaction force in a higher accuracy.

Figure 5:
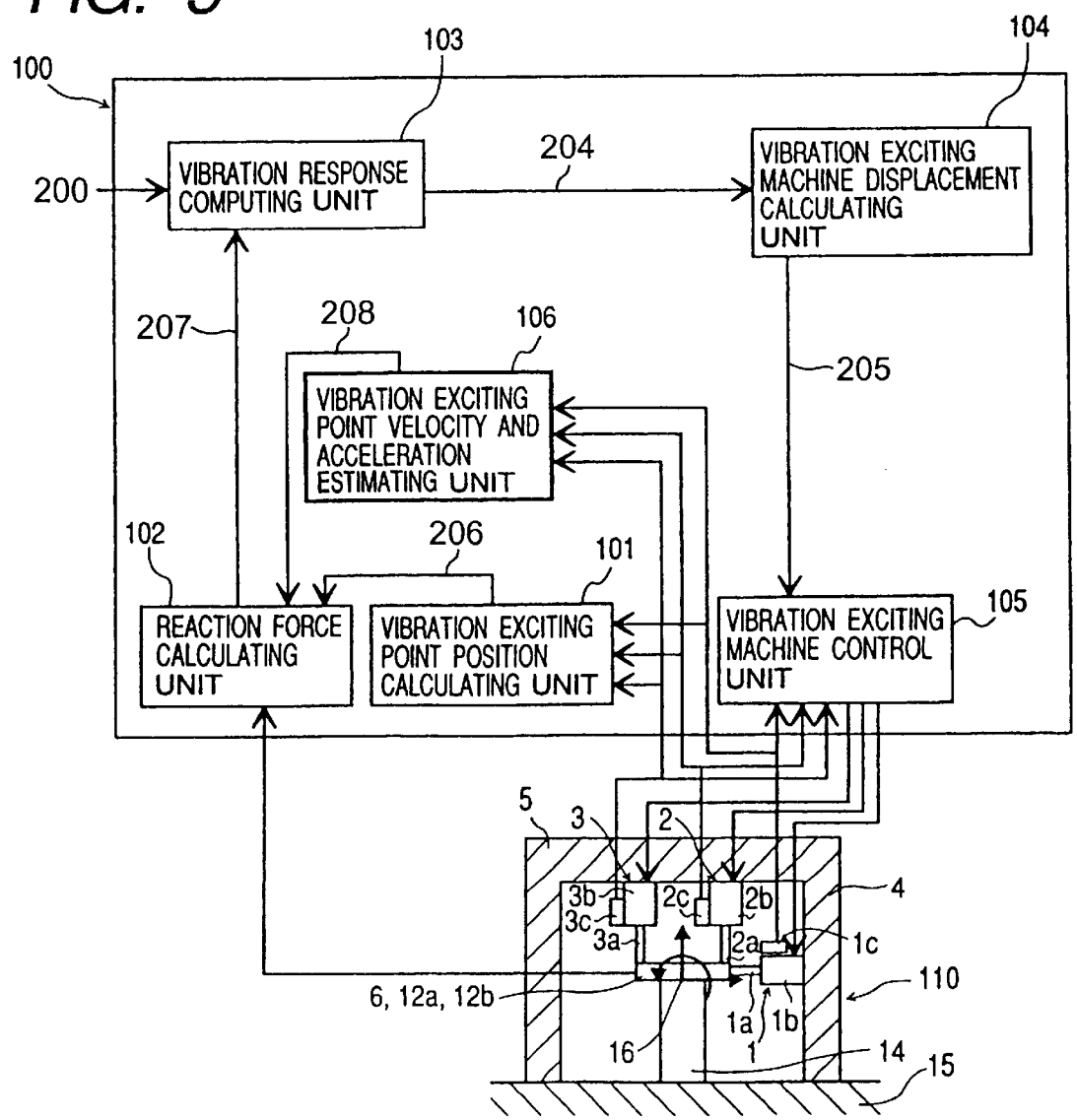
FIG. 5 is a schematic view of another embodiment of a vibration testing system in accordance with the invention.

In this case, as shown in Formula 5, in order to calculate the reaction force generated in the prototype model 14, in addition to the load detected in the load detector 12, values of a force of inertia, a centrifugal force, a Corioli's force and an overturning moment which act on the joint 6, the joint 7 and the load detector 12 are necessary. Among them, the overturning moment can be calculated when the position of the point of exciting force 16 can be known. On the contrary, with respect to the force of inertia, the centrifugal force and the Corioli's force, they can be calculated when the acceleration of the point of exciting force 16 is known. Then, an embodiment of the control calculating apparatus 100 in which these amounts are calculated and the influence thereof is compensated will be shown in FIG. 5.

In the control calculating apparatus 100, there are provided vibration exciting point velocity estimating unit 106a for estimating a velocity at the point of exciting force 16 and vibration exciting point acceleration estimating unit 106b for estimating the acceleration on the basis of the displacement, the velocity and the acceleration of the vibration exciting machine. In the reaction force calculating unit 102, the reaction force 207 is calculated by using Formula 5 on the basis of the load detected by the load detector, the position of the point of exciting force 206 calculated by the vibration exciting point position calculating unit 101, the velocity of the point of exciting force estimated by the vibration exciting point velocity estimating unit 106a, and the acceleration of the point of exciting force estimated by the vibration exciting point acceleration estimating unit 106b. At this time, in accordance with the method mentioned above, the force of inertia, the centrifugal force, the Corioli's force and over turning moment are compensated. In this vibration exciting point velocity estimating unit 106a and the vibration exciting point acceleration estimating unit 106b, for example, the position of the point of exciting force 206 obtained on the basis of the displacement of the vibration exciting machine is differentiated, and the velocity and the acceleration of the point of exciting force 208 are estimated from the displacement, the velocity and acceleration of the vibration exciting machine by using an observer. In accordance with the present embodiment, since it is possible to estimate the velocity by the vibration exciting point velocity estimating unit 106*a* and estimate the acceleration by the vibration exciting point acceleration estimating unit 106*b*, the force of inertia, the centrifugal force and the Corioli's force can be compensated and the reaction force can be obtained at a higher accuracy.

Figure 6:
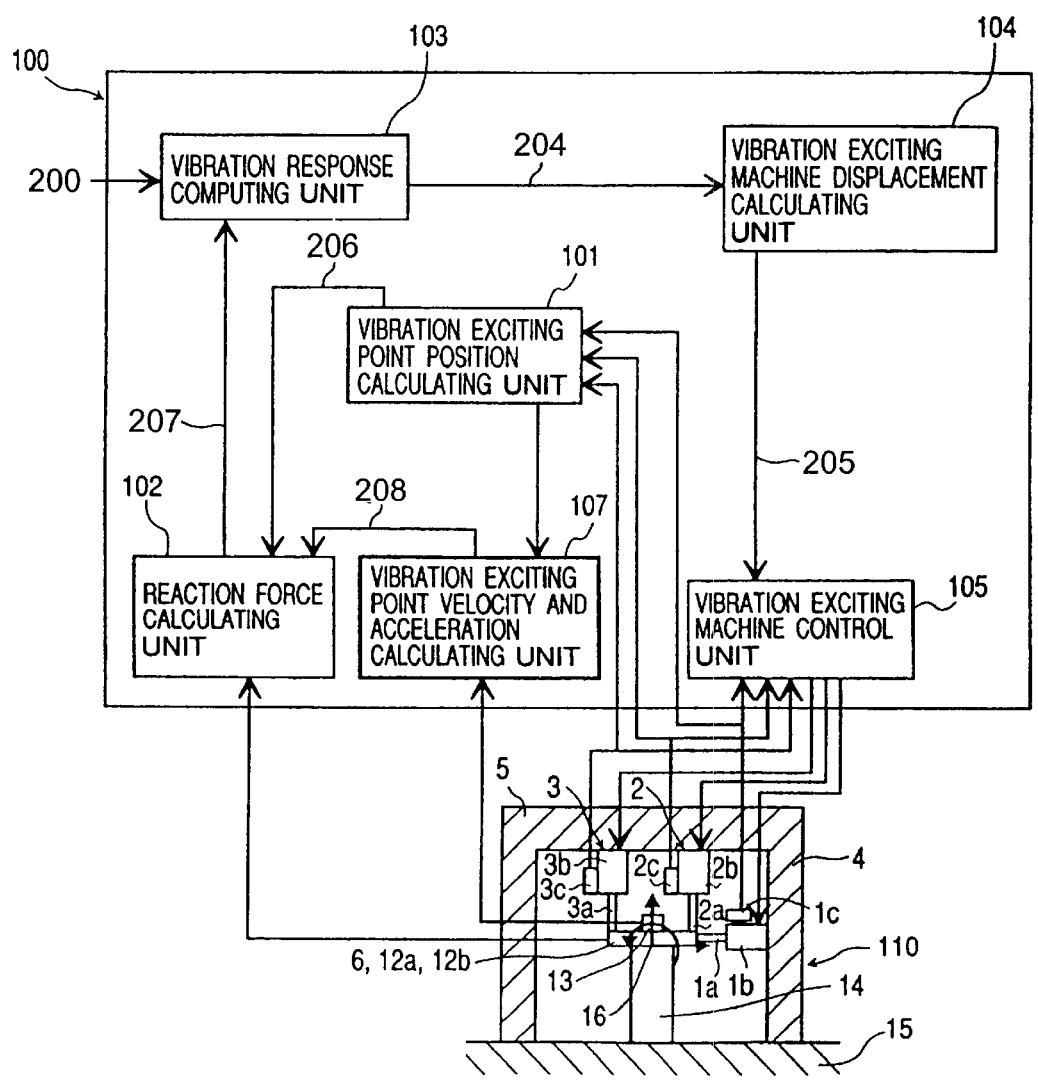
FIG. 6 is a schematic view of the further other embodiment of a vibration testing system in accordance with the invention.
Figure 7:
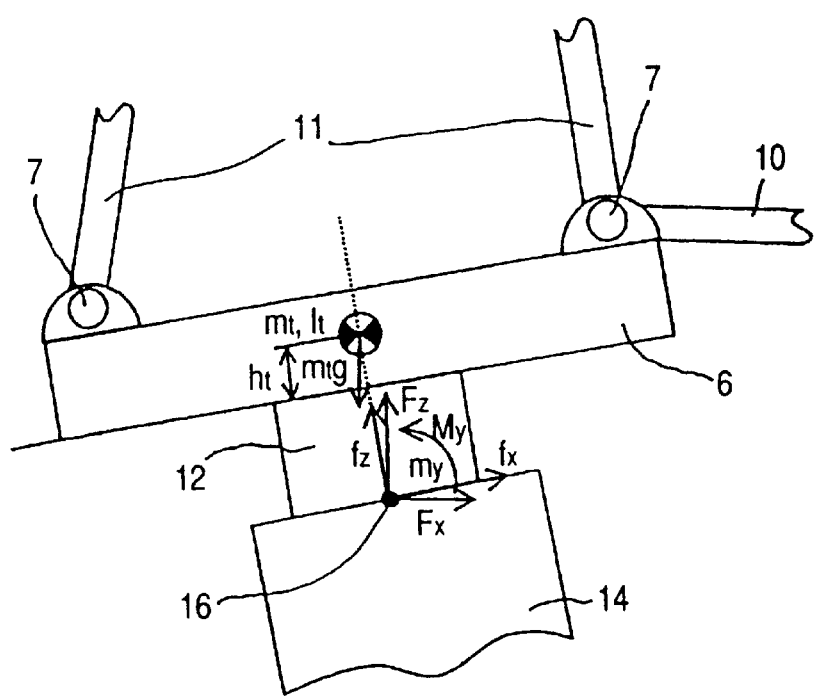
FIG. 7 is a schematic view of the other embodiment of the load detecting.

Next, the third embodiment of this invention is explained by using FIG. 6. This embodiment is different from the second embodiment in view that acceleration detector 13*a* and angular velocity detector 13*b* are provided in the joint 6 in order to obtain the velocity and the acceleration of the point of exciting force. It is possible to calculate the velocity and the acceleration of the point of exciting force at a high accuracy by using the output of these acceleration detector 13*a* and angular velocity detector 13*b*. In this case, the acceleration detector 13*a* and the angular velocity detector 13*b* may be separated bodies, and may be an integrated body. Further, the angular velocity may be calculated on the basis of the value detected by the acceleration detector 13*a*. Furthermore, in addition to the angular velocity detector 13*b*, the angular acceleration detector 13*c* may be provided. In this case, it is possible to calculate the velocity and the acceleration of the point of exciting force in a simple manner.

The vibration exciting point velocity and acceleration calculating unit 107 calculates the velocity and the acceleration of the point of exciting force 16 on the basis of the acceleration and the angular velocity detected by the acceleration detector 13*a* and the angular velocity detector 13*b*. The reaction force calculating unit 102 compensates the force of inertia, the centrifugal force, the Colioli's force and the overturning moment on the basis of the load detected by the load detector 12, the position of the point of exciting force 16 calculated by the vibration exciting point position calculating unit 101, and the velocity and the acceleration of the point of exciting force 16 calculated by the vibration exciting point velocity and acceleration calculating unit 107, and calculates the reaction force in accordance with Formula 5. In this case, in the vibration exciting point velocity and acceleration calculating unit 107, for example, the acceleration and the angular velocity respectively detected by the acceleration detector 13*a* and the angular velocity detector 13*b* is performed a transformation of coordinate system.

In accordance with the present embodiment, since the acceleration detector 13*a* and the angular velocity detector 13*b* are provided in the joint 6 and the unit 107 for calculating the velocity and the acceleration of the point of exciting force on the basis of detected acceleration and angular velocity is provided in the control calculating apparatus 100, the force of inertia can be compensated with respect to the reaction force measured by the reaction force measuring means, so that it is possible to obtain the reaction force at a higher accuracy. In this case, in the embodiment mentioned above, the angular acceleration is calculated on the basis of the detected value of the angular velocity, however, when detector for detecting the angular acceleration is independently provided, the velocity and the acceleration of the point of exciting force can be obtained at a higher accuracy.

Further the other embodiment of the vibration testing system in accordance with the invention will be described below. The load detector 12 for detecting the loads in two perpendicularly crossing directions and the moment around the axis crossing perpendicular to the load detecting direction is provided between joint 6 and the prototype model 14. The details of the joint 6 are shown in FIG. 8. In the present embodiment structured in this manner, the reaction force can be calculated on the basis of Formula 6.

$$F_x = f_x \cos\theta_y - f_z \sin\theta_y$$

$$F_z = f_x \sin\theta_y + f_z \cos\theta_y$$

$$M_y = m_y \qquad \text{(Formula 6)}$$

In which, $f_x$, $f_z$, $m_y$: load detected by the load detectors

In accordance with the present embodiment, it is possible to detect the reaction force at a high accuracy in the same manner as each of the embodiment mentioned above.

In either embodiments mentioned above, the multi-axis vibration exciting apparatus can cause vibration excitation in the translational direction and the rotational direction on the basis of a predetermined with respect to the body to be tested. Further, the vibration testing system has functions necessary for the vibration excitation testing such as a conversion from the position of the point of exciting force to the displacement of the vibration exciting machine, a conversion from the displacement of the vibration exciting machine to the point of exciting force corresponding to an inverse conversion thereof, a detection of the reaction force in the body to be tested and the like.

In accordance with the invention, even in the case that the subject structure deforms in both of the translational direction and the rotational direction, it is possible to perform a vibration testing of a whole of the structure at high accuracy by actually performing the vibration excitation testing of a part of the structure and combining the calculus of vibration response of the other parts of the structure. Then, there can be provided a multi-axis vibration exciting apparatus which can improve an accuracy of the vibration excitation in the vibration exciting testing and can be used in the vibration testing system having a compact size and a high rigidity.

This invention can be carried out by various other shape without deviating from that mind or the main feature. Therefore, the preferable embodiments mentioned in this specification are shown only as an exemplified structure and are not shown in a limited manner. The scope of this invention is stated by the accompanying claims, and all the modified embodiments within the claims will be contained in the scope of this invention.

What is claimed is:

1. A vibration exciting apparatus comprising:

at least three vibration exciting means for vibrating a test specimen;

a frame onto which said vibration exciting means are mounted; and at least two joints which structurally connect the test specimen and said vibration exciting means within said frame, wherein said frame comprises side walls and a top plate connected to said side walls, wherein each of said vibration exciting means has a driving shaft, a joint disposed at an end portion of said driving shaft and a cylinder inside which said driving shaft can move, an end portion of said cylinder being mounted at an outside surface of one of said side walls and said top plate.

\* \* \* \* \*